United States Patent
Wang et al.

(10) Patent No.: US 8,359,139 B2
(45) Date of Patent: Jan. 22, 2013

(54) METHOD AND SYSTEM FOR VEHICLE ORIENTATION MEASUREMENT

(75) Inventors: Guoping Wang, Naperville, IL (US);
Bingcheng Ni, Naperville, IL (US);
Peter J. Dix, Naperville, IL (US); Keith W. Wendte, Willowbrook, IL (US)

(73) Assignee: CNH America LLC, New Holland, PA (US)

( * ) Notice: Subject to any disclaimer, the term of this patent is extended or adjusted under 35 U.S.C. 154(b) by 824 days.

(21) Appl. No.: 12/210,293

(22) Filed: Sep. 15, 2008

(65) Prior Publication Data
US 2010/0070178 A1    Mar. 18, 2010

(51) Int. Cl.
*G01C 21/00* (2006.01)

(52) U.S. Cl. .............. 701/50; 701/23; 701/468

(58) Field of Classification Search ............ 701/23, 701/25, 26, 50, 412, 455, 466, 468, 472
See application file for complete search history.

(56) References Cited

U.S. PATENT DOCUMENTS

| | | | |
|---|---|---|---|
| 4,734,683 A | 3/1988 | Howell, Jr. et al. | |
| 5,075,864 A * | 12/1991 | Sakai | 701/217 |
| 5,454,432 A | 10/1995 | Le Clezio | |
| 5,684,691 A | 11/1997 | Orbach et al. | |
| 5,764,511 A | 6/1998 | Henderson | |
| 5,809,440 A * | 9/1998 | Beck et al. | 701/50 |
| 5,915,313 A * | 6/1999 | Bender et al. | 111/178 |
| 5,938,709 A * | 8/1999 | Hale et al. | 701/50 |
| 5,951,612 A | 9/1999 | Sahm | |
| 6,070,539 A * | 6/2000 | Flamme et al. | 111/177 |
| 6,199,000 B1 * | 3/2001 | Keller et al. | 701/50 |
| 6,434,462 B1 | 8/2002 | Bevly et al. | |
| 6,553,299 B1 | 4/2003 | Keller et al. | |
| 6,810,315 B2 * | 10/2004 | Cessac | 701/50 |
| 6,845,311 B1 | 1/2005 | Stratton et al. | |
| 7,058,495 B2 | 6/2006 | Budde et al. | |
| 7,096,105 B2 * | 8/2006 | Ho et al. | 701/50 |
| 7,147,241 B2 | 12/2006 | Beaujot et al. | |
| 7,162,348 B2 | 1/2007 | McClure et al. | |
| 7,715,979 B2 * | 5/2010 | Dix | 701/207 |
| 7,844,378 B2 * | 11/2010 | Lange | 701/50 |
| 2002/0072850 A1 * | 6/2002 | McClure et al. | 701/213 |
| 2003/0187560 A1 | 10/2003 | Keller et al. | |
| 2005/0015189 A1 | 1/2005 | Posselius et al. | |
| 2006/0086295 A1 * | 4/2006 | Jensen | 111/118 |
| 2006/0142936 A1 * | 6/2006 | Dix | 701/200 |
| 2008/0257570 A1 * | 10/2008 | Keplinger et al. | 172/9 |

* cited by examiner

*Primary Examiner* — Khoi Tran
*Assistant Examiner* — Jason Holloway
(74) *Attorney, Agent, or Firm* — Patrick M. Sheldrake

(57) ABSTRACT

The orientation of a self-propelled vehicle or a towed vehicle relative to the direction of travel of the vehicle can be determined by mounting two ground speed sensors on the vehicle. The orientation of the vehicle relative to the direction of travel of the vehicle can be used to correct the error in the location of an implement mounted on the vehicle determined by a GPS system mounted on the vehicle or the vehicle towing the implement due to crabbing of the vehicle as the vehicle travels substantially perpendicular to a significant slope.

21 Claims, 5 Drawing Sheets

METHOD AND SYSTEM FOR VEHICLE ORIENTATION MEASUREMENT

FIELD OF THE INVENTION

The present invention generally relates to a system for measuring vehicle orientation, particularly to towed vehicles and self-propelled vehicles having a global positioning system (GPS) mounted on the towing vehicle or the self-propelled vehicle, and more particularly to such vehicles and the method of operating such vehicles on terrain with a significant side slope. The present invention also relates to a method of locating the position of implements mounted on such vehicles, and particularly to the method of locating the position of implements mounted on such a vehicle with respect to rows of crops and with respect to the rows of strip tillage. Towed vehicles include, but not limited to, vehicles and implements that are towed by a tractor drawbar and vehicles and implements that are either fully or semi mounted via a tractor hitch.

BACKGROUND OF THE INVENTION

Real time kinematic (RTK) global positioning system (GPS) technology has been integrated with precision farming methodology to provide highly accurate seeding, cultivating, planting and harvesting operations. RTK GPS systems are used to control fully or semi-autonomous vehicles in these operations.

With RTK GPS that includes a local portable base station, the GPS can locate the tractor on which a GPS antenna is mounted to within less than an inch. With this capability, the location of the tractor, and therefore the individual plants of the crop, can be recorded. The position information derived from the GPS receiver can be employed to automatically guide the tractor on a predefined working path. This is true particularly on flat terrain where orientation of the tractor and any vehicle towed by the tractor is parallel to the direction of travel. However, when the terrain has a significant side slope, the tractor and any towed vehicle will tend to "crab" or "side wind", i.e., orienting the tractor and towed vehicle at an angle to the line of travel due to the tractor and towed vehicle sliding sideways due to the influence of gravity.

When slopes are in the range of 2% or greater, contour farming is more effective. With this technique, the tractor and towed equipment traverse perpendicular to the slope, slowing the effect of soil erosion caused by water run-off and thus substantially increasing crop yields. However, gravity pulls the towed vehicle off the path of the tractor and it is very important for both the tractor and towed vehicle to stay on course.

When the towed vehicle is not in alignment with the tractor, the angle between the orientation of the tractor and the orientation of the towed vehicle must be measured to be able to compensate for the towed vehicle being off the path of the tractor. If this condition remains uncompensated, the towed vehicle, such as a planter or fertilizer applicator, might not be in alignment with the rows of strip-tillage and not be able to plant seeds or apply fertilizers efficiently, or such as a harvester, might not be in alignment with the rows of crops and not be able to harvest the crop efficiently.

Also, the tractor must be angled slightly uphill to compensate for the pull of gravity and maintain the tractor on the desired working path perpendicular to the slope. Therefore, even if the implement is mounted on a self-propelled vehicle, the vehicle orientation with respect to the direction of vehicle travel must be determined and compensated for, so that the implement is in alignment with the rows of crops.

In order to guide the towed vehicle to track the desired path, some mechanical apparatus, such as hydraulically operated coulter systems, can be attached to the towed vehicle to make it capable of electronically steering itself. There are other means to accomplish this, for instance, by steering the towed vehicle's carrying wheels.

Additionally, in order to guide the towed vehicle automatically, one must know either the true position of the towed vehicle relative to the path to be followed or the location of the towed vehicle relative to the tractor. A system using a second GPS antenna and receiver on the towed vehicle has provided such information in prior systems. However, the use of a second GPS antenna and receiver is a very expensive solution.

The location of the towed vehicle relative to the tractor can be determined using an angular position sensing system. However, the orientation of the tractor must be known to determine the location of the towed vehicle relative to the GPS antenna mounted on the tractor. The orientation of the tractor has been determined by using two GPS antennas and receivers fixed to the tractor. However, this again, is a very expensive solution.

SUMMARY OF THE INVENTION

In a preferred form of the invention, a vehicle has first and second non-aligned ground speed sensors mounted on the vehicle. An electronic control unit is electrically connected to the two ground speed sensors. Each of the ground speed sensors generates an output signal correlated to a speed projection of the sensor. The electronic control unit is programmed to compute the angle between the vehicle orientation and the vehicle direction of travel utilizing the output signals of the two ground speed sensors.

The invention also is directed to a method of measuring the orientation of a vehicle that includes mounting first and second non-aligned ground speed sensors on the vehicle. Each of the ground speed sensors generates an output signal correlated to a speed projection of the sensor. An electronic control unit electrically connected to the two ground speed sensors is provided and is programmed to compute the angle between the vehicle orientation and the vehicle direction of travel utilizing the output signals of the two ground speed sensors.

Another preferred form of the invention is a method for determining the location of an implement towed by or mounted on a vehicle that includes mounting first and second non-aligned ground speed sensors on the vehicle. Each of the ground speed sensors generates an output signal correlated to a speed projection of the sensor. An electronic control unit electrically connected to the two ground speed sensors is provided and is programmed to compute the angle between the vehicle orientation and the vehicle direction of travel utilizing the output signals of the two ground speed sensors. The electronic control unit is also connected to a GPS antenna through a receiver and utilizes the location of the GPS antenna, the direction of travel of the vehicle, and the angle between the vehicle orientation and the vehicle direction of travel to determine the location of the implement.

Other features and advantages of the present invention will be apparent from the following more detailed description of the preferred embodiment, taken in conjunction with the accompanying drawings which illustrate, by way of example, the principles of the invention, and the appended claims.

DETAILED DESCRIPTION OF THE INVENTION

Figure 1:
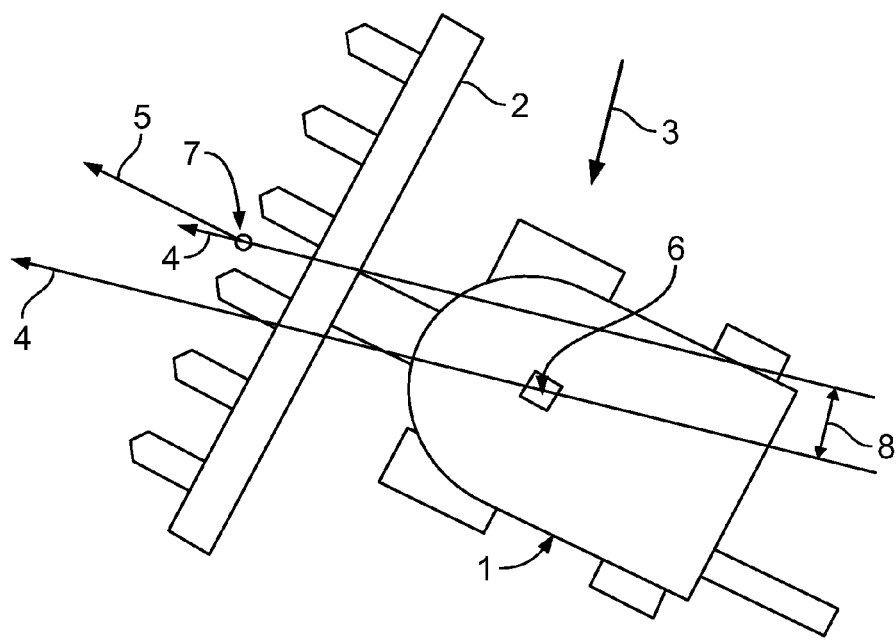
FIG. 1 is a schematic top view of a combine illustrating the crabbing effect on a side slope.

While the present invention is susceptible of embodiment in various forms, there is shown in the drawings and will hereinafter be described a preferred embodiment of the present invention with the understanding that the present disclosure is to be considered as an exemplification of the invention that is not intended to limit the invention to the specific embodiment illustrated.

While the description of the invention mainly discusses farm equipment, it also has application to other fields of use including road construction and maintenance equipment, such as graders, dozers, compactors, pavers and profilers, as well as earth working, mining and transportation equipment. Farming operations in which the present invention is useful include seeding, cultivating, planting, spraying and harvesting.

Referring now to the drawings, wherein like reference numerals refer to like parts, a vehicle, such as a combine 1, with an implement, such as cutting header 2, is shown traversing terrain having a significant slope. The direction of the slope is shown by arrow 3. In other words, with the operator seated in combine 1 facing cutting header 2, the front and rear tires to the operator's right hand side are disposed at a vertically higher position than the front and rear tires to the operator's left hand side. To maintain a desired direction of travel 4, the combine 1 must be oriented slightly uphill (shown by arrow 5) to overcome the effects of gravity.

The combine 1 has a GPS antenna 6 mounted on the centerline of the combine 1 to be able to precisely locate the combine. The location of the row of crops (not shown) is known, since the crops would have been planted with a machine having a GPS antenna and computer to record the location of the planted crops.

As shown in FIG. 1, point of control 7, which is to be aligned with the row of crops for the cutting header 2 to operate properly, is offset from the line showing the direction of travel 4 that passes through the GPS antenna 6. This is due to the orientation (shown by arrow 5) of the combine 1 not being parallel to its direction of travel 4. This offset or error 8 can be compensated for if the orientation 5 of the combine 1 is determined.

Figure 2:
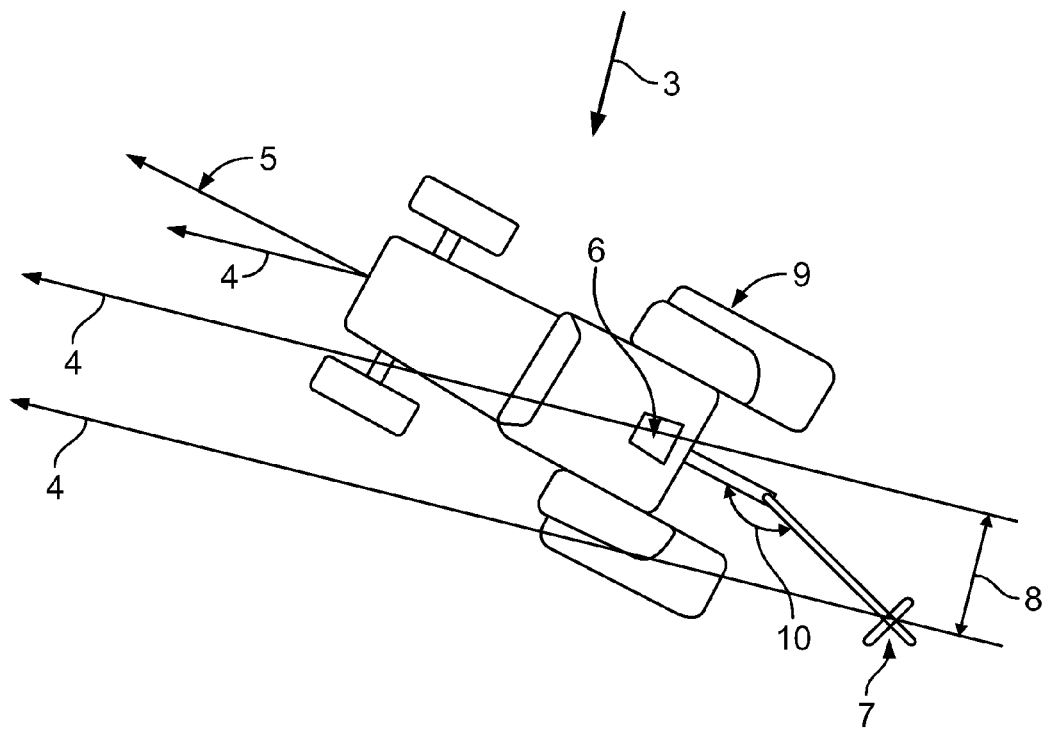
FIG. 2 is a schematic top view of a tractor with a towed vehicle (not shown) illustrating the crabbing effect on a side slope.

As shown in FIG. 2, this error is compounded if the towed vehicle 13 (not shown in FIG. 2, but shown schematically in FIGS. 3 to 5) is towed by a tractor 9. Not only does gravity affect the orientation of the tractor 9, but also the orientation of the towed vehicle 13. Therefore the location of the point of control 7 is also affected.

Since the dimensions of the tractor 9 and towed vehicle 13 are known, the location of the control point 7 relative to the GPS antenna 6 can be calculated if the angle 10 between the orientation of the first vehicle (towed vehicle 13) and the orientation of the second vehicle (tractor 9) is determined. Angle 10 can be calculated if the orientation of both vehicles is known or the angle 10 can be measured. Therefore, the location of control point 7 relative to the rows of crops can be determined.

The present invention permits determination of the vehicle orientation and the angle between the orientation of the tractor 9 and the towed vehicle 13 without the use of a second GPS system. As shown schematically in FIGS. 3 to 5, two ground speed sensors 11, 12 are mounted on the towed vehicle 13. The ground speed sensors 11, 12 are not in alignment so that two different speed projections $v_1$, $v_2$ of the towed vehicle's ground speed vector relative to the directions of the ground speed sensors 11, 12 are detected.

An electronic control unit (not shown) processes the output signals of the ground speed sensors 11, 12 to obtain the speed projections $v_1$, $v_2$. The electronic control unit is preferably mounted on the tractor 9, but could be mounted on the towed vehicle 13. The electronic control unit uses the two speed projections $v_1$, $v_2$ to compute the angle between the towed vehicle's orientation 5 and the towed vehicle's direction of travel 4, such as shown in FIG. 2 for tractor 9, according to the computing algorithm shown in FIG. 6.

The ground speed sensors 11, 12 are mounted on the towed vehicle 13 in one of two configurations. In the first configuration, shown in FIGS. 3 and 4, the ground speed sensors 11, 12 are oriented to measure speed in two quadrants. The quadrants are defined by one line parallel to the vehicle's orientation 5 and one line perpendicular to the vehicle's orientation 5. Preferably, the two quadrants in which the ground speed sensors 11, 12 are oriented are adjacent.

Figure 3:
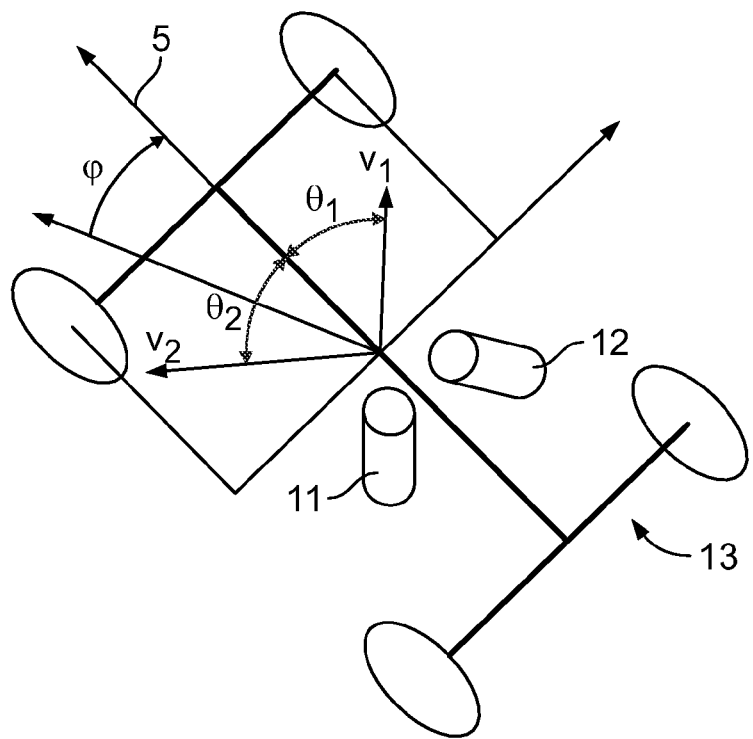
FIGS. 3 to 5 are schematic representations of vehicles illustrating the location of two non-aligned ground speed sensors in accordance with the present invention.

For example, in FIG. 3, the first ground speed sensor 11 measures the speed of the towed vehicle 13 in a left backward direction of the towed vehicle 13 relative to the direction of orientation 5. The electronic control unit converts the speed measured by ground speed sensor 11 to terms of speed projection $v_1$. The second ground speed sensor 12 measures the speed of the towed vehicle 13 in a right backward direction of the towed vehicle 13 relative to the direction of orientation 5. The electronic control unit converts the speed measured by ground speed sensor 12 to terms of speed projection $v_2$.

Figure 4:
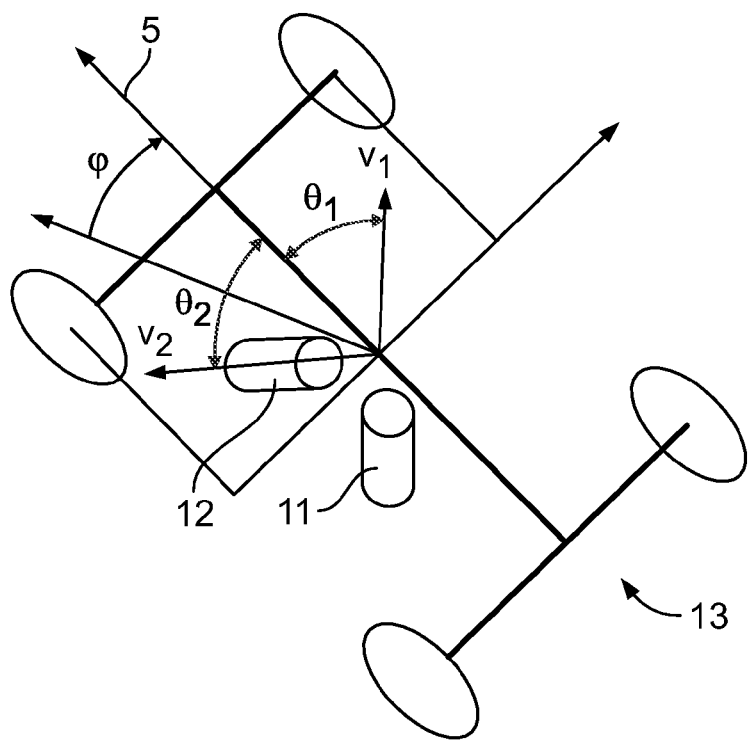

In the embodiment shown in FIG. 4, the first ground speed sensor 11 measures the speed of the towed vehicle 13 in a left backward direction of the towed vehicle 13 relative to the direction of orientation 5. The electronic control unit converts the speed measured by ground speed sensor 11 to terms of speed projection $v_1$. The second ground speed sensor 12 measures the speed of the towed vehicle 13 in a left forward direction of the towed vehicle 13 relative to the direction of orientation 5. The electronic control unit converts the speed measured by ground speed sensor 12 to terms of speed projection $v_2$.

Obvious variations in mounting the ground speed sensors 11, 12 include orienting them to measure speed projections in a left forward direction relative to the direction of orientation 5 and a right forward direction relative to the direction of orientation 5, or in a right forward direction relative to the direction of orientation 5 and a right backward direction relative to the direction of orientation 5. Other variations in mounting the ground speed sensors 11, 12 include orienting them in opposite quadrants, e.g., right forward and left backward relative to the direction of orientation 5, or in the same quadrant, but exclude orienting them in the same direction or orienting them in the opposite directions because in that configurations the two sensors will essentially measure the same speed projection.

Therefore, the ground speed sensors 11, 12 may be oriented in the following directions: (a) ground speed sensor 11 may be oriented left backward relative to the direction of orientation 5 of the towed vehicle 13 and ground speed sensor 12 may be oriented right backward relative to the direction of orientation 5 of the towed vehicle 13, (b) ground speed sensor 11 may be oriented left forward relative to the direction of orientation 5 of the towed vehicle 13 and ground speed sensor 12 may be oriented right forward relative to the direction of orientation 5 of the towed vehicle 13, (c) ground speed sensor 11 may be oriented left forward relative to the direction of orientation 5 of the towed vehicle 13 and ground speed sensor 12 may be oriented left backward relative to the direction of orientation 5 of the towed vehicle 13, (d) ground speed sensor 11 may be oriented right forward relative to the direction of orientation 5 of the towed vehicle 13 and ground speed sensor 12 may be oriented right backward relative to the direction of orientation 5 of the towed vehicle 13, (e) ground speed sensor 11 may be oriented backward relative to the direction of orientation 5 of the towed vehicle 13 and ground speed sensor 12 may be oriented rightward relative to the direction of orientation 5 of the towed vehicle 13, (f) ground speed sensor 11 may be oriented forward relative to the direction of orientation 5 of the towed vehicle 13 and ground speed sensor 12 may be oriented rightward relative to the direction of orientation 5 of the towed vehicle 13, (g) ground speed sensor 11 may be oriented backward relative to the direction of orientation 5 of the towed vehicle 13 and ground speed sensor 12 may be oriented leftward relative to the direction of orientation 5 of the towed vehicle 13, or (h) ground speed sensor 11 may be oriented forward relative to the direction of orientation 5 of the towed vehicle 13 and ground speed sensor 12 may be oriented leftward relative to the direction of orientation 5 of the towed vehicle 13.

Figure 5:
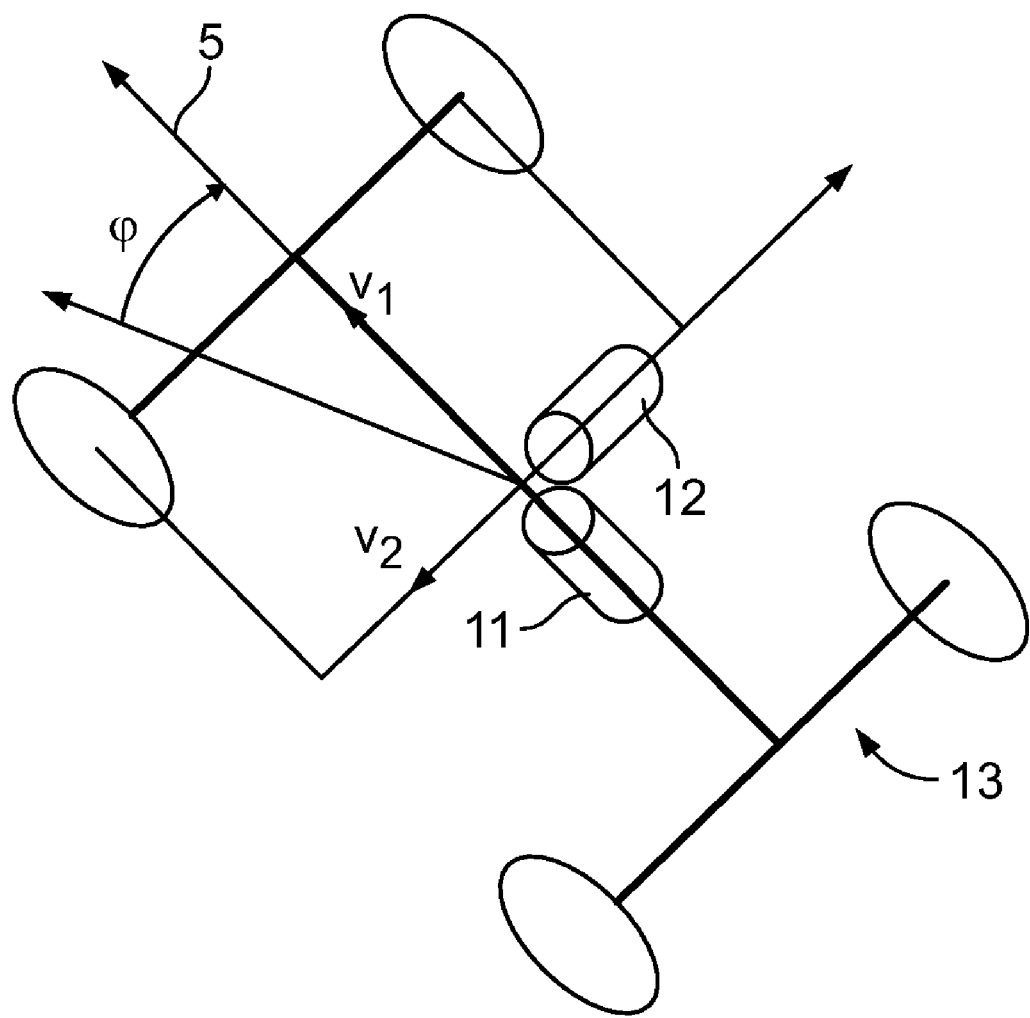

The second configuration, shown in FIG. 5, has a ground speed sensor 11 oriented to measure the ground speed of the towed vehicle 13 in the direction of towed vehicle orientation 5. The electronic control unit converts the speed measured by ground speed sensor 11 in terms of speed projection $v_1$ in the longitudinal direction of the orientation 5 of the towed vehicle 13. A second ground speed sensor 12 is oriented to measure the ground speed of the towed vehicle 13 in the direction perpendicular to towed vehicle orientation 5. The electronic control unit converts the speed measured by ground speed sensor 12 in terms of speed projection $v_2$ in the lateral direction of the orientation 5 of the towed vehicle 13. In this configuration, the second ground speed sensor 12 must provide a direction signal with regard to left or right direction of the sideways speed.

The output signals of the ground speed sensors 11, 12 are electrically connected to the electronic control unit. The electronic control unit processes the signal from the ground speed sensor 11 to obtain the speed projection $v_1$. Similarly, the electronic control unit processes the signal from the ground speed sensor 12 to obtain the speed projection $v_2$. The electronic control unit then uses the obtained speed projections $v_1$, $v_2$ to compute the orientation angle $\phi$ of the towed vehicle 13 with respect to the direction of travel 4 of the towed vehicle 13 in accordance with the computing algorithm shown in FIG. 6.

Figure 6:
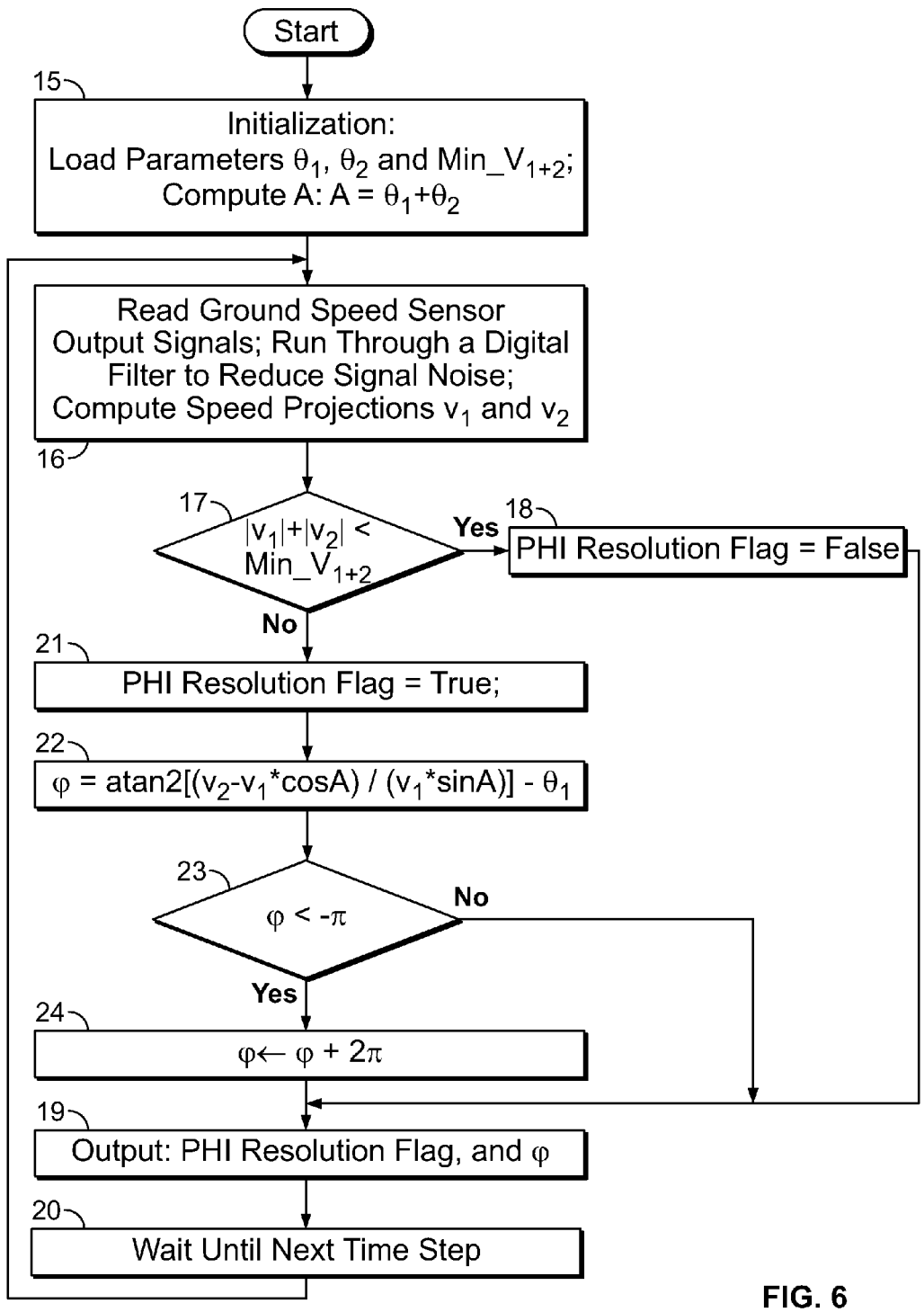
FIG. 6 is a flow chart showing an algorithm computation performed by an electronic control unit of the present invention.

Referring to FIG. 6, parameters $\theta_1$, $\theta_2$ and $Min\_v_{1+2}$ are loaded into the electronic control unit and A equal to $\theta_1+\theta_2$ is computed in step 15. As shown in FIGS. 3 and 4, $\theta_1$ is the angle between the orientation of the ground speed projection of ground speed sensor 11 and the orientation 5 of the vehicle 13 and $\theta_2$ is the angle between the orientation of the ground speed projection of ground speed sensor 12 and the orientation 5 of the vehicle 13. The symbol $Min\_v_{1+2}$ represents the speed threshold for computing the vehicle orientation angle $\phi$. If the vehicle speed is extremely slow, such as less than 0.4 mph, the electronic control unit will not compute the vehicle orientation angle $\phi$.

In step 16, the outputs from the ground speed sensors 11, 12 are sampled by the electronic control unit. The sampled speed sensor output signals are then processed by the electronic control unit through a digital filter (not shown) to reduce signal noise and the speed projections $v_1$, $v_2$ are computed by the electronic control unit. If the sum of the absolute values of the speed projections $v_1$, $v_2$ is less than the speed threshold $Min\_v_{1+2}$ in step 17, the phi resolution flag is false, as indicated at step 18, and the vehicle orientation angle $\phi$ is not valid in step 19. The logic value "False" of the phi resolution flag is an indicator that the vehicle orientation angle cannot be accurately calculated. After waiting for the predetermined interval of time set in step 20, the output signals from the ground speed sensors 11, 12 are again sampled and filtered by the electronic control unit and the speed projections $v_1$, $v_2$ are computed by the electronic control unit in step 16.

If the sum of the absolute values of the speed projections $v_1$, $v_2$ is greater than or equal to the speed threshold $Min\_v_{1+2}$ in step 17, the phi resolution flag is true, as indicated at step 21, and the value of the vehicle orientation angle $\phi$ will be calculated.

The value of the vehicle orientation angle $\phi$ is calculated in step 22 by the following equation: $\phi = a\tan 2[(v_2 - v_1 * \cos A)/(v_1 * \sin A)] - \theta_1$. The a tan 2( ) is the four-quadrant inverse tangent function, which returns values in the range of –pi to pi. If the calculated value of vehicle orientation angle $\phi$ is greater than or equal to $-\pi$ in step 23, the calculated value of the vehicle orientation angle $\phi$ is sent as the output of the computing algorithm in step 19. After waiting for the predetermined interval of time set in step 20, the output signals from the ground speed sensors 11, 12 are again sampled and filtered by the electronic control unit, and the speed projections $v_1$, $v_2$ are computed by the electronic control unit in step 16.

If the calculated value of vehicle orientation angle $\phi$ is less than $-\pi$ in step 23, the value of $\phi$ is then adjusted by increasing the value of $\phi$ by $2\pi$ in step 24 so that the adjusted value of $\phi$ is within the range of $-\pi$ to $\pi$, that is, the range of –180 to +180 degrees. The adjusted value of the vehicle orientation angle $\phi$ is sent as the output of the computing algorithm in step 19. After waiting for the predetermined interval of time set in step 20, the output signals from the ground speed sensors 11, 12 are again sampled and filtered by the electronic control unit, and the speed projections $v_1$, $v_2$ are computed by the electronic control unit in step 16.

The equations in step 22, 23 and 24 can be replaced with the following equations for an equivalent computing algorithm: $\phi = \theta_2 - a\tan 2[(v_1 - v_2 * \cos A)/(v_2 * \sin A)]$ in step 22, $\phi > \pi$ in step 23, and $\phi \leftarrow \phi - 2\pi$ in step 24.

A positive value of $\phi$ represents right rotation of the vehicle orientation 5 from the direction of travel 4 and a negative value of $\phi$ represents left rotation. If the ground speed sensors 11, 12 do not provide direction signals, then the sensor orientations should be the case that $0 < \theta_1 + \theta_2 <= 90°$, and measureable range of angle $\phi$ is the angular range established by $\theta_1$ and $\theta_2$ shown in FIG. 3. The case in which $\theta_1 + \theta_2 = 90°$ is a special case included in the algorithm.

Figure 7:
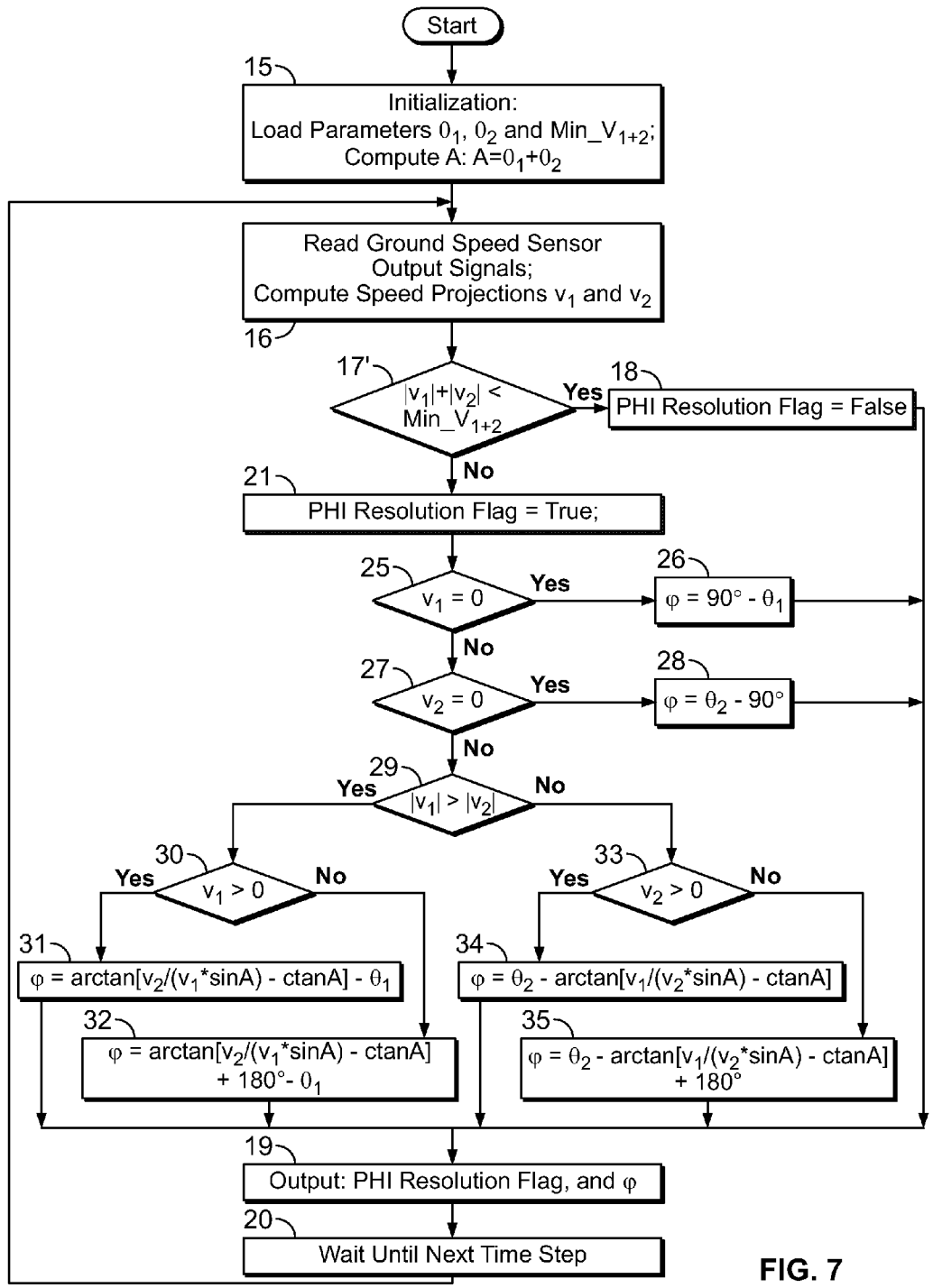
FIG. 7 is a second flow chart showing an alternate algorithm computation performed by an electronic control unit of the present invention.

FIG. 7 is a second flow chart showing an alternate algorithm computation that may be performed by an electronic control unit. Parameters $\theta_1$, $\theta_2$ and $Min\_v_{1+2}$ are loaded into the electronic control unit and A equal to $\theta_1 + \theta_2$ is computed in step 15. As shown in FIGS. 3 and 4, $\theta_1$ is the angle between the orientation of the ground speed projection of ground speed sensor 11 and the orientation 5 of the vehicle 13 and $\theta_2$ is the angle between the orientation of the ground speed projection of ground speed sensor 12 and the orientation 5 of the vehicle 13. The symbol $Min\_v_{1+2}$ represents the speed threshold for computing the vehicle orientation angle φ. If the vehicle speed is extremely slow, such as less than 0.4 mph, the electronic control unit will not compute the vehicle orientation angle φ.

In step 16, the outputs from the ground speed sensors 11, 12 are sampled by the electronic control unit and the speed projections $v_1$, $v_2$ are computed by the electronic control unit. If the sum of the absolute values of the speed projections $v_1$, $v_2$ is less than the speed threshold Min_$v_{1+2}$ in step 17', the phi resolution flag is false, as indicated at step 18, and the vehicle orientation angle φ is not valid in step 19. The logic value "False" of the phi resolution flag is an indicator that the vehicle orientation angle cannot be accurately calculated. After waiting for the predetermined interval of time set in step 20, the output signals from the ground speed sensors 11, 12 are again sampled by the electronic control unit and the speed projections $v_1$, $v_2$ are computed by the electronic control unit in step 16.

If the sum of the absolute values of the speed projections $v_1$, $v_2$ is greater than or equal to the speed threshold Min_$v_{1+2}$ in step 17', the phi resolution flag is true, as indicated at step 21, and the value of the vehicle orientation angle φ will be calculated. If the speed projection $v_1$ is equal to zero in step 25, the vehicle orientation angle φ is equal to $90°-\theta_1$ in step 26, which value is sent to the electronic control unit output in step 19. After waiting for the predetermined interval of time set in step 20, the output signals from the ground speed sensors 11, 12 are again sampled to the electronic control unit and the speed projections $v_1$, $v_2$ are computed by the electronic control unit in step 16.

If the speed projection $v_1$ is not equal to zero in step 25 and the speed projection $v_2$ is equal to zero in step 27, the vehicle orientation angle φ is equal to $\theta_2-90°$ in step 28, which value is sent to the electronic control unit output in step 19. After waiting for the predetermined interval of time set in step 20, the output signals from the ground speed sensors 11, 12 are again sampled by the electronic control unit and the speed projections $v_1$, $v_2$ are computed by the electronic control unit in step 16.

If the speed projection $v_2$ is not equal to zero in step 27, the absolute value of the speed projection $v_1$ is compared to the absolute value of the speed projection $v_2$ in step 29. If the absolute value of the speed projection $v_1$ is greater than the absolute value of the speed projection $v_2$, the value of the speed projection $v_1$ is determined to be positive or negative in step 30. If the value of the speed projection $v_1$ is positive, the vehicle orientation angle φ is equal to arctan $[v_2/(v_1*\sin A)-c \tan A]-\theta_1$ in step 31, which value is sent to the electronic control unit output in step 19. After waiting for the predetermined interval of time set in step 20, the output signals from the ground speed sensors 11, 12 are again sampled by the electronic control unit and the speed projections $v_1$, $v_2$ are computed by the electronic control unit in step 16.

If the value of the speed projection $v_1$ is negative, the vehicle orientation angle φ is equal to arctan $[v_2/(v_1*\sin A)-c \tan A]+180°-\theta_1$ in step 32, which value is sent to the electronic control unit output in step 19. After waiting for the predetermined interval of time set in step 20, the output signals from the ground speed sensors 11, 12 are again sampled by the electronic control unit and the speed projections $v_1$, $v_2$ are computed by the electronic control unit in step 16.

If the absolute value of the speed projection $v_1$ is less than the absolute value of the speed projection $v_2$ in step 29, the value of the speed projection $v_2$ is determined to be positive or negative in step 33. If the value of the speed projection $v_2$ is positive, the vehicle orientation angle φ is equal to $\theta_2$-arctan $[v_1/(v_2*\sin A)-c \tan A]$ in step 34, which value is sent to the electronic control unit output in step 19. After waiting for the predetermined interval of time set in step 20, the output signals from the ground speed sensors 11, 12 are again sampled by the electronic control unit and the speed projections $v_1$, $v_2$ are computed by the electronic control unit in step 16.

If the value of the speed projection $v_2$ is negative, the vehicle orientation angle φ is equal to $\theta_2$-arctan $[v_1/(v_2*\sin A)-c \tan A]-180°$ in step 35, which value is sent to the electronic control unit output in step 19. After waiting for the predetermined interval of time set in step 20, the output signals from the ground speed sensors 11, 12 are again sampled by the electronic control unit and the speed projections $v_1$, $v_2$ are computed by the electronic control unit in step 16.

A positive value of φ represents right rotation of the vehicle orientation 5 from the direction of travel 4 and a negative value of φ represents left rotation. If the ground speed sensors 11, 12 do not provide direction signals, then the sensor orientations should be the case that $0<\theta_1+\theta_2<=90°°$, and measureable range of angle φ is the angular range established by $\theta_1$ and $\theta_2$ shown in FIG. 3. The case in which $\theta_1+\theta_2=90°$ is a special case included in the algorithm.

To be able to determine the location of the point of control 7, the angle 10 between the orientation of the towed vehicle 13 and the tractor 9 must be determined. Once the angle between the orientation of the tractor 9 and the orientation of the towed vehicle 13 is determined, application of simple geometry may be used to determine the location of the point of control 7 and therefore the location of the towed vehicle 13, relative to the GPS antenna 6. Assuming that the locations of the crops were recorded using the output from the GPS system on the farm equipment used to plant the crops, the location of the towed vehicle 13 relative to the row of crops can be determined and the path of the towed vehicle 13 can be adjusted, if necessary.

There are known methods to measure the angle 10 between the orientation of the tractor 9 and the orientation of the towed vehicle 13, such as disclosed in Bevly et al. U.S. Pat. No. 6,434,462 and Beaujot et al. U.S. Pat. No. 7,147,241, which are each incorporated herein by reference in its entirety, discloses a system. The electronic control unit can then calculate the orientation of the tractor 9 using the orientation of the towed vehicle 13 and the angle 10 between the orientation of the tractor 9 and the orientation of the towed vehicle 13. Then the electronic control unit can calculate the location of the towed vehicle 13 relative to the row of crop using the location of the GPS antenna 6, the angle 10 between the orientation of the tractor 9 and the orientation of the towed vehicle 13, and the geometry of the tractor 9 and the towed vehicle 13, including the distance between the GPS antenna 6 and the tractor hitch and the distance between the tractor hitch and the point of control 7.

Alternatively, the orientation 5 of the tractor 9 relative to the direction of travel 4 of the tractor 9 can be measured in a manner similar to measuring the orientation 5 of the towed vehicle 13 by mounting two additional ground speed sensors on the tractor 9 or if two GPS antennae are mounted on the tractor. If it is assumed that the direction of travel of the tractor 9 is the same as the direction of travel 4 of the towed vehicle 13, the angle 10 between the orientation of the tractor 9 and the orientation of the towed vehicle 13 can then be calculated. Then the location of the point of control 7 and the towed vehicle 13 can be determined.

If the implement is self-propelled, such as cutting header 2 mounted on combine 1, the orientation of the self-propelled implement can be determined in a similar manner by mounting the ground speed sensors 11, 12 on the combine 1. Then the location of the point of control 7 relative to the GPS antenna 6 and the rows of crops can be determined by simple geometry.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A vehicle comprising:
   first and second non-aligned ground speed sensors mounted on the vehicle, each ground speed sensor angled downwardly for receiving a speed signal from the ground and generating an output signal correlated to a speed projection of the sensor; and
   an electronic control unit electrically connected to the two ground speed sensors and a GPS antenna through a receiver;
   wherein the electronic control unit computes using an algorithm an orientation angle between a heading of the vehicle indicating vehicle orientation and a direction of travel of the vehicle as a function of the first and second speed projections detected respectively by the first and second non-aligned ground speed sensors and known mounting angles of both of the sensors; and
   the electronic control unit utilizes the location of the GPS antenna determined with the GPS system, the direction of travel of the vehicle and the angle between the vehicle orientation and the vehicle direction of travel to determine at least one of the orientation of the vehicle or position of an attached implement.

2. The vehicle of claim 1, wherein the ground speed sensors are not in alignment and configured such that two different speed projections of a vehicle ground speed vector relative to the directions of the ground speed sensors are detected.

3. The vehicle of claim 2, wherein the known mounting angles used in the algorithm computing the angle of heading and direction of travel are the angles between each seed vector and the heading of the vehicle.

4. The vehicle of claim 1, wherein four generally equal quadrants are defined by a line in the direction of the vehicle orientation and a line perpendicular to the vehicle orientation, the first ground speed sensor being oriented to measure speed along the line in the direction of the vehicle orientation and the second ground speed sensor being oriented to measure speed along the line perpendicular to the vehicle orientation.

5. The vehicle of claim 1, wherein the vehicle is towed by a second vehicle, wherein the second vehicle has the GPS system mounted thereon, and wherein the electronic control unit is programmed to utilize the location of the second vehicle as determined with the GPS system, the direction of travel of the second vehicle, and the angle between the first vehicle orientation and the first vehicle direction of travel to determine the location of the first vehicle.

6. The vehicle of claim 1, wherein the vehicle is self-propelled and has the GPS system and the implement mounted thereon, and wherein the electronic control unit is programmed to utilize the angle between the vehicle orientation and the vehicle direction of travel to determine the location of the implement.

7. A method of measuring the orientation of a vehicle comprising:
   mounting first and second non-aligned ground speed sensors on the vehicle, each ground speed sensor angled downwardly for receiving a speed signal from the ground and generating an output signal correlated to a speed projection of the sensor;
   providing an electronic control unit electrically connected to the two ground speed sensors;
   programming the electronic control unit to compute the angle between a heading of the vehicle and the vehicle direction of travel as a function of the first and second speed projections detected by the two ground speed sensors and known mounting positions of each of the sensors; and
   wherein the sensors are mounted non-aligned and configured such that in use two different speed projections of a vehicle ground speed vector relative to the directions of the ground speed sensors are detected; and
   determining the orientation of the vehicle with the electronic control unit, utilizing the location of a GPS antenna determined with a GPS system, the direction of travel of the vehicle and the angle between the vehicle heading.

8. The method of claim 7, wherein the first ground speed sensor is oriented in at least one of the follow positions: (a) the first ground speed sensor is oriented left backward relative to the direction of orientation of the vehicle and the second ground speed sensor is oriented right backward relative to the direction of orientation of the vehicle, (b) the first ground speed sensor is oriented left forward relative to the direction of orientation of the vehicle and the second ground speed sensor is oriented right forward relative to the direction of orientation of the vehicle, (c) the first ground speed sensor is oriented left forward relative to the direction of orientation of the vehicle and the second ground speed sensor is oriented left backward relative to the direction of orientation of the vehicle, (d) the first ground speed sensor is oriented right forward relative to the direction of orientation of the vehicle and the second ground speed sensor is oriented right backward relative to the direction of orientation of the vehicle, (e) the first ground speed sensor is oriented backward relative to the direction of orientation of the vehicle and the second ground speed sensor is oriented rightward relative to the direction of orientation of the vehicle, (f) the first ground speed sensor is oriented forward relative to the direction of orientation of the vehicle and the second ground speed sensor is oriented rightward relative to the direction of orientation of the vehicle, (g) the first ground speed sensor is oriented backward relative to the direction of orientation of the vehicle and the second ground speed sensor is oriented leftward relative to the direction of orientation of the vehicle, or (h) the first ground speed sensor is oriented forward relative to the direction of orientation of the vehicle and the second ground speed sensor is oriented leftward relative to the direction of orientation of the vehicle.

9. The method of claim 7, wherein four generally equal quadrants are defined by a line in the direction of the vehicle orientation and a line perpendicular to the vehicle orientation, the first ground speed sensor being oriented to measure speed in a first quadrant and the second ground speed sensor being oriented to measure speed in a second quadrant adjacent to the first quadrant.

10. The method of claim 7, wherein four quadrants are defined by a line in the direction of the vehicle orientation and a line perpendicular to the vehicle orientation, the first ground speed sensor being oriented to measure speed along the line in the direction of the vehicle orientation and the second ground speed sensor being oriented to measure speed along the line perpendicular to the vehicle orientation.

11. A method of determining the location of an implement mounted on a vehicle comprising:
   mounting first and second non-aligned ground speed sensors on the vehicle, each ground speed sensor angled downwardly for receiving a speed signal from the ground and generating an output signal correlated to a speed projection of the sensor;
   providing an electronic control unit electrically connected to the two ground speed sensors; and
      programming the electronic control unit to compute the angle between a heading of the vehicle indicating vehicle orientation and the vehicle direction of travel as a function of the first and second the speed projections detected by the two ground speed sensors and the mounting angles of both of the sensors with respect to a common reference of the vehicle, the sensors are mounted and configured such that two different speed projections of a vehicle ground speed vector relative to the directions of the around speed sensors are detected; and
   wherein the electronic control unit is also electrically connected to a GPS antenna through a receiver and wherein the electronic control unit utilizes the location of the GPS antenna determined with the GPS system, the direction of travel of the vehicle and the angle between the vehicle orientation and the vehicle direction of travel to determine the location of the implement.

12. The method of claim 11, wherein the vehicle on which the implement is mounted is a first vehicle towed by a second vehicle and wherein the GPS system is mounted on the second vehicle.

13. The method of claim 12, wherein the angle between the orientation of the first vehicle and the orientation of the second vehicle is determined and is utilized by the electronic control unit to determine the location of the implement.

14. The method of claim 13, wherein the angle between the orientation of the first vehicle and the orientation of the second vehicle is determined by determining the orientation of the second vehicle, comparing the orientation of the second vehicle with the orientation of the first vehicle and calculating the angle between the orientation of the first vehicle and the orientation of the second vehicle.

15. The method of claim 13, wherein the angle between the orientation of the first vehicle and the orientation of the second vehicle is determined by measuring the relative orientation of one vehicle with respect to the other vehicle.

16. The method of claim 12, wherein the second vehicle is a farm tractor, the location of the implement being utilized to align the implement with rows of crops or rows of strip tillage.

17. The method of claim 11, wherein the vehicle on which the implement is mounted is self-propelled and the GPS system is mounted on the vehicle, and wherein the electronic control unit utilizes the angle between the vehicle orientation and the vehicle direction of travel to determine the location of the implement.

18. The method of claim 17, wherein the vehicle is a combine and the implement is a set of cutting heads, the location of the cutting heads being utilized by the electronic control unit to align the cutting heads with rows of crops.

19. The method of claim 11, wherein known mounting angles of the sensors used in the algorithm computing the angle of heading and direction of travel are the angles between each speed vector and the heading of the vehicle.

20. The method of claim 11, wherein four generally equal quadrants are defined by a line in the direction of the vehicle orientation and a line perpendicular to the vehicle orientation, the first ground speed sensor being oriented to measure speed along the line in the direction of the vehicle orientation and the second ground speed sensor being oriented to measure speed along the line perpendicular to the vehicle orientation.

21. The vehicle of claim 1, wherein if the vehicle speed is determined by the sensors to be below a predetermined threshold, the electronic control unit is configured to not compute the vehicle orientation angle.

* * * * *